UNITED STATES PATENT OFFICE.

CHARLES BASKERVILLE, OF NEW YORK, N. Y., ASSIGNOR TO WELSBACH LIGHT COMPANY, OF GLOUCESTER CITY, NEW JERSEY, A CORPORATION OF NEW JERSEY.

PROCESS OF EXTRACTING THORIA FROM MONAZITE SAND.

1,087,099. Specification of Letters Patent. Patented Feb. 17, 1914.

No Drawing. Application filed February 26, 1912. Serial No. 679,919.

*To all whom it may concern:*

Be it known that I, CHARLES BASKERVILLE, a citizen of the United States, and resident of the borough of Manhattan, in the city, county, and State of New York, have invented certain new and useful Improvements in Processes of Extracting Thoria from Monazite Sand; and I do hereby declare the following to be a full, clear, and exact description of the invention, such as will enable others skilled in the art to which it appertains to make and use the same.

My invention relates to certain new and useful improvements in the extraction of thoria from monazite sand, particularly with the purpose of obtaining the thoria in such condition as to be available for use in the preparation of the Welsbach mantle.

Monazite sand may be said to be essentially a mixed phosphate of the rare earths, the thorium present occurring either as a phosphate, or, as has been suggested by some, as a silicate. The composition of monazite sand is somewhat variable, even when the methods employed for connecting and separating it have been efficient and well conducted. In general, however, monazite may be said to have (in round numbers) the following approximate composition, to wit:

$P_2O_5$ _____ 29.
$Ce_2O_3$ (earths) _____ 31.
$Di_2O_3$ (earths) _____ 31.
$SiO_2$ _____ 1.50
$ThO_2$ _____ 6.50

Commercial monazite sand contains silica as well as some silicates, among its constituents, and as will be hereinafter noted, their presence requires special provision in the practice of the invention.

In carrying out my invention, I contemplate a procedure which will result in the reduction and volatilization of the phosphorus and the simultaneous production of a silicon compound likewise volatile at the temperatures employed, so that the resultant product of the furnace operation shall be in large part devoid both of phosphorus and silicon. To this end, I employ carbon and a suitable fluorid as, for example, calcium fluorid in admixture with the monazite sand, and subject the mixture to the high temperature incident to the action of the electric current, either direct or alternating, in a suitable electric furnace.

The operation is attended by the volatilization of phosphorus, the metals appearing in the product in the form of carbids. So also silicon tetrafluorid is produced which is volatilized and which is driven off at the temperature of its production. The product of the furnace operation described is thereafter to be digested with hydrochloric or other acid so as to form a solution from which the thoria can be extracted by various chemical methods. I have found, however, that the said furnace product or residue is quite hard and is difficult to pulverize, whereas for economical reasons, it is necessary to pulverize it in order to assist the prompt action of the hydrochloric acid, *i. e.*, the finer the degree of pulverization, the more readily it is acted upon by the acid. In order to overcome this difficulty, and to reduce the expense of grinding, it is desirable to introduce within the mass, a certain amount of calcium carbid by producing it simultaneously by the well known reaction of fusing either quicklime or limestone with carbon. Accordingly, in the preferred practice of my invention, I so compound the furnace mixture that not only will the phosphorus and silicon be eliminated, but also so that there will be produced in and throughout the final product a suitable quantity of calcium carbid which, when the furnace product is subjected to the action of water, is decomposed, evolving acetylene gas, and which permits the mass to become readily disintegrated and then cheaply ground to the fineness desired. In the preferred practice of my invention, therefore, I compound the furnace charge in the following proportions:

Monazite sand _____ 1 pound
Carbon (preferably as petroleum coke) _____ 1.1 "
Quick-lime _____ 0.8 "
Calcium flourid _____ 0.15 "

It will, of course, be understood that these proportions may be varied somewhat according to circumstances, and that they depend upon the composition of the variable constituents, particularly the monazite sand, with respect to the amount of silica or silicates as well as the amount of phosphate associated with it.

In carrying out my invention, I have used various types of furnaces, as, for instance, the resistance-heat furnace of the Stockem type, the resistance furnace of the Acheson carborundum type, the Moissan arc furnace, and the Heroult crucible furnace. As it is desirable to fuse the mass thoroughly, in order to effect complete reaction, and in order to avoid preliminary grinding of the monazite sand, a crucible furnace was found most satisfactory. So also, in practice, I have found it suitable to employ alternating current varying in amperage from 100 to 300 amperes and in voltage from 25 to 60 volts. With the charges of the sizes used, the best results were obtained with a current of 125 amperes and 35 volts, and with a furnace duration of treatment of from 1 to 1½ hours, although it will be understood that the practice is not to be restricted to the use of these limits. I do not limit myself, however, to the employment of any particular type of electric furnace, the essential thing being, in that regard, to make the electric current available as a sufficient source of heat. In fact, any other source of heat of sufficient intensity may be employed, when available for the purpose.

The furnace product, as hereinbefore indicated, is permitted to slake (with the evolution of acetylene) either by exposure to the air, or by disintegrating it by throwing it before or after cooling, into water. This water may be drawn off, together with the amount of calcium hydroxid which it holds in solution or suspension, for the reason that the calcium hydroxid would materially increase the consumption of the acid necessary to obtain the rare earth carbids in solution. The residue is then digested with hydrochloric or other acid, and being subsequently filtered, gives a liquid from which the thorium may be extracted. Any unattacked residue may be used in a subsequent charge.

In so far as I am aware, it is broadly new to facilitate the breaking down of a hard and difficultly-pulverizable electric furnace product by the generation of calcium carbid within the mass, so that subsequent slaking shall subserve the disintegrating function referred to.

Having thus described my invention, what I claim is:

1. The method of extracting thoria from monazite sand, which comprises subjecting a mixture containing monazite sand, carbon, and a suitable fluorid, to a temperature sufficient to eliminate the phosphorus and silicon present in the sand, and to convert the metals into carbids; substantially as described.

2. The method of extracting thoria from monazite sand, which comprises subjecting a mixture of monazite, carbon and calcium fluorid to a temperature sufficient to eliminate the phosphorus and silicon present in the sand, and to convert the metals into carbids; substantially as described.

3. The method of extracting thoria from monazite sand, which comprises subjecting a mixture of monazite, carbon, lime and a suitable fluorid to a temperature sufficient to eliminate the phosphorus and silicon in the sand, and to convert the metals into carbids, and then disintegrating the resulting furnace product by slaking it; substantially as described.

4. The method of facilitating the breaking down of a hard and difficultly pulverizable product, which consists during the formation of said product in generating calcium carbid as a constituent thereof.

5. The method of facilitating the breaking down of a hard and difficultly pulverizable product, which consists during the formation of said product in generating calcium carbid as a constituent thereof, and subsequently removing the calcium carbid by slaking.

In testimony whereof I affix my signature, in presence of two witnesses.

CHARLES BASKERVILLE.

Witnesses:
H. A. HAMOR,
THOMAS F. O'KEEFFE.

It is hereby certified that in Letters Patent No. 1,087,099, granted February 17, 1914, upon the application of Charles Baskerville, of New York, N. Y., for an improvement in "Processes of Extracting Thoria from Monazite Sand," an error appears in the printed specification requiring correction as follows: Page 1, line 26, for the word "connecting" read *collecting;* and that the said Letters Patent should be read with this correction therein that the same may conform to the record of the case in the Patent Office.

Signed and sealed this 10th day of March, A. D., 1914.

[SEAL.]

R. T. FRAZIER,
*Acting Commissioner of Patents.*